No. 682,070. Patented Sept. 3, 1901.
H. C. HART.
MACHINE FOR MAKING WASHERS.
(Application filed Apr. 16, 1901.)
(No Model.) 6 Sheets—Sheet 1.

Witnesses
Walter Williams
Percy C. Wooldridge

Inventor
Hubert C. Hart
By Jno. Imrie
Attorney

No. 682,070. Patented Sept. 3, 1901.
H. C. HART.
MACHINE FOR MAKING WASHERS.
(Application filed Apr. 16, 1901.)
(No Model.) 6 Sheets—Sheet 4.

UNITED STATES PATENT OFFICE.

HUBERT CHAUNCEY HART, OF UNIONVILLE, CONNECTICUT.

MACHINE FOR MAKING WASHERS.

SPECIFICATION forming part of Letters Patent No. 682,070, dated September 3, 1901.

Application filed April 16, 1901. Serial No. 56,158. (No model.)

*To all whom it may concern:*

Be it known that I, HUBERT CHAUNCEY HART, a citizen of the United States, residing at Unionville, in the county of Hartford and State of Connecticut, have invented new and useful Improvements in Machines for Making Washers, of which the following is a specification.

This invention contemplates improvements in machines for making washers from wire or the like.

The object of the invention is to provide a machine for successively feeding the wire step by step, cutting and bending the same into separate rings, and then compressing the ring to produce a washer whose density is increased and volume decreased, and finally the ejecting of the finished washer to a receptacle.

The invention also contemplates improvements in the revolving carrier which receives the ring and carries it into position to be operated upon by the die and its coöperating member for compressing said ring into a flat washer, and upon further movement of the carrier it positions the washer opposite an ejector, at which point it is delivered to a chute leading to a receiving-receptacle.

A further object of the invention is to provide in a machine for making washers a mechanism for automatically feeding step by step the wire from which the ring is formed, means for automatically bending the wire, means for automatically delivering the ring from its forming-mandrel to a carrier, means for automatically operating the carrier to position the ring to be operated upon by the anvil, and means for automatically ejecting the finished washer.

A further object of the invention is to provide a mandrel disposed eccentrically to two oppositely-revolving formers, whereby the wire for making a ring from which a washer is to be made is gradually and uniformly pressed to the mandrel and into a complete circle.

Many other objects and advantages will become apparent in the description to follow and will be particularly pointed out in the claims.

In the drawings.

The same numerals refer to like parts in all the figures.

1 represents a bed supported on legs 2 and on which the whole of the operating mechanism is supported.

To better enable one to gain a comprehensive knowledge of the operation of the invention, the elements for carrying out the successive degrees for accomplishing the desired result will be described in their regular order—to wit, the means for feeding the wire, means for simultaneously cutting the wire into lengths and bending said wire into rings, means for operating the various plungers, and means for carrying the ring step by step from where it is formed to the anvil and thence carrying it in position to be ejected.

*Means for feeding the wire step by step.—* Mounted in the bearings 3, secured to the bed-plate 1, is a main driving-shaft 4, carrying loosely on its outer end a power-wheel 5, controlled by a clutch 6, of any well-known type. A cam 7 is fixed to the shaft 4 and operates a cam-lever 8, connected to an arm 9, loosely mounted on a short shaft 10 and carrying a pawl 12. The shaft 10 is mounted in suitable bearings, and on opposite ends of said shaft is fixed, respectively, a ratchet-wheel 14 and a gear-wheel 15. The gear-wheel 15 meshes with a pinion 16, fixed to a shaft 17, carrying, respectively, a second pinion 18 and a feed-roller 19, the latter having in its periphery a slight groove 20. Mounted above the shaft 17 is a similar shaft 22, equipped with a pinion 23 and roller 24, the latter having a slight depression similar to the depression or groove 20 in the roller 19. The roller 24 and pinion 23 correspond in size with the roller 19 and pinion 16. The wire 26 is passed between the rollers 19 and 24 and thence through a guide 27, adjustably held in a standard fixed to the bed 1. Motion from the cam 7 imparts a forward movement of the arm 9, which operates the ratchet-wheel 14, revolving the shaft 10, thence through the train of gearing the feed-rollers 19 and 24, feeding a length of wire, which when bent will equal the diameter of a mandrel hereinafter to be referred to. Immediately the active face of the cam 7 recedes the arm carrying the pawl 12 is drawn over the face of the ratchet by a spring 28, and the pawl is reset for the next successive feed.

Figure 1:
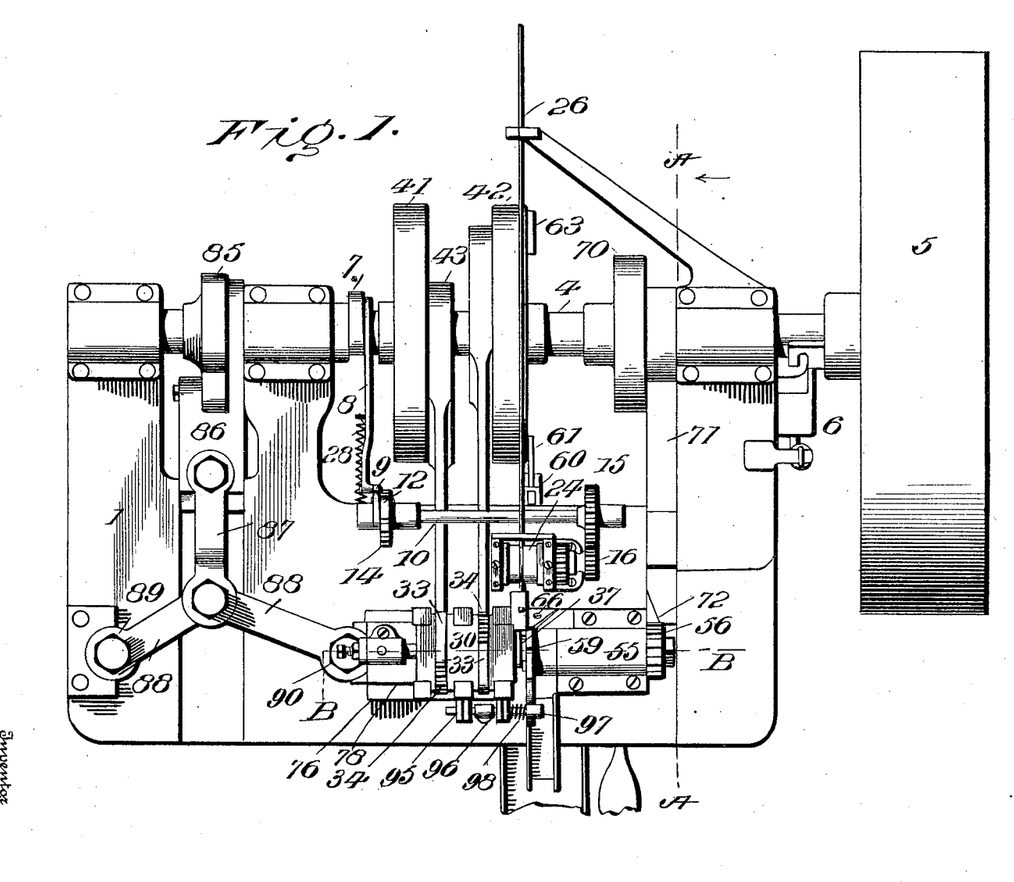
Figure 1 is a plan view.
Figure 2:
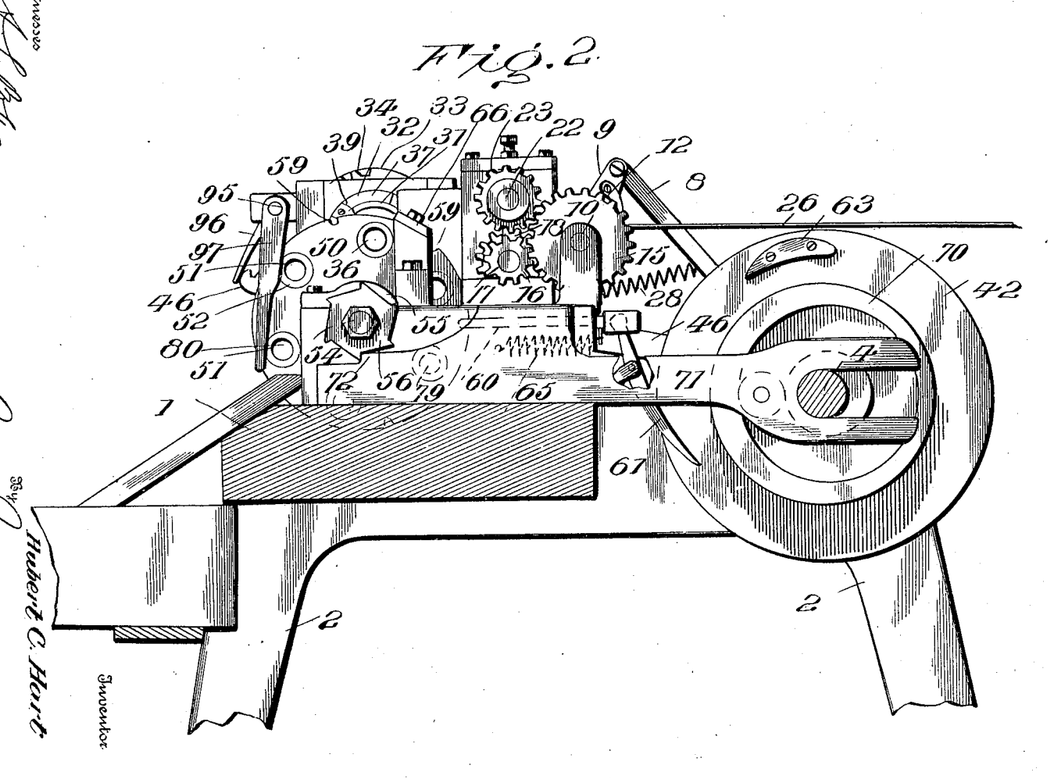
Fig. 2 is a section on the line A A of Fig. 1 looking in the direction of the arrow.
Figure 3:
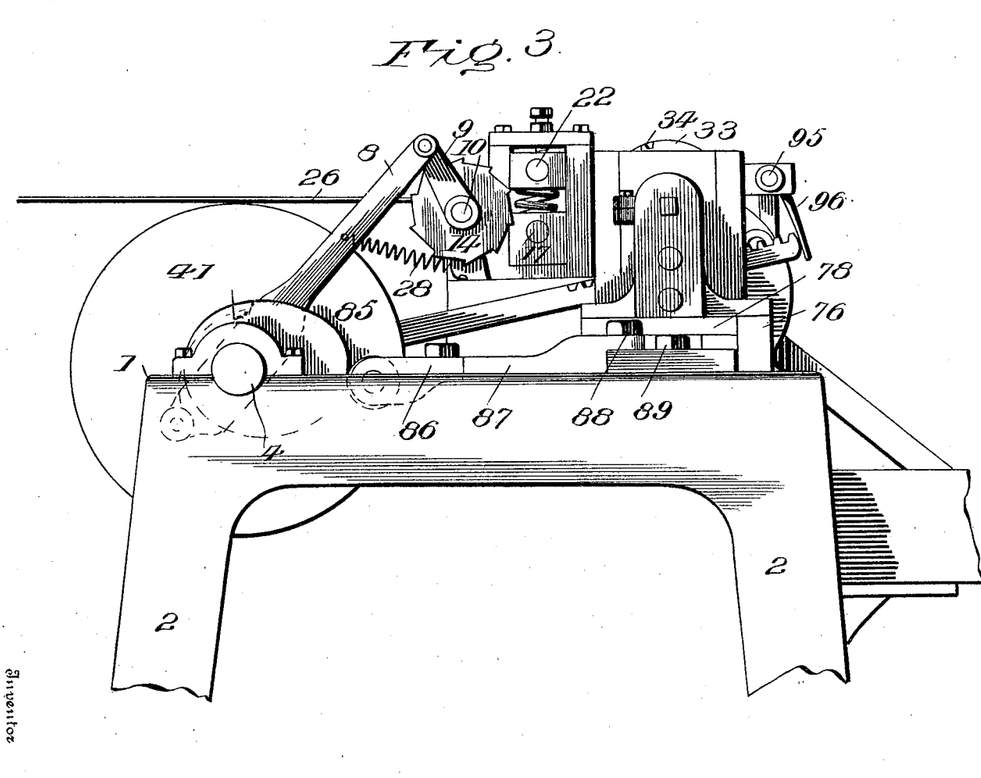
Fig. 3 is a side elevation.
Figure 4:
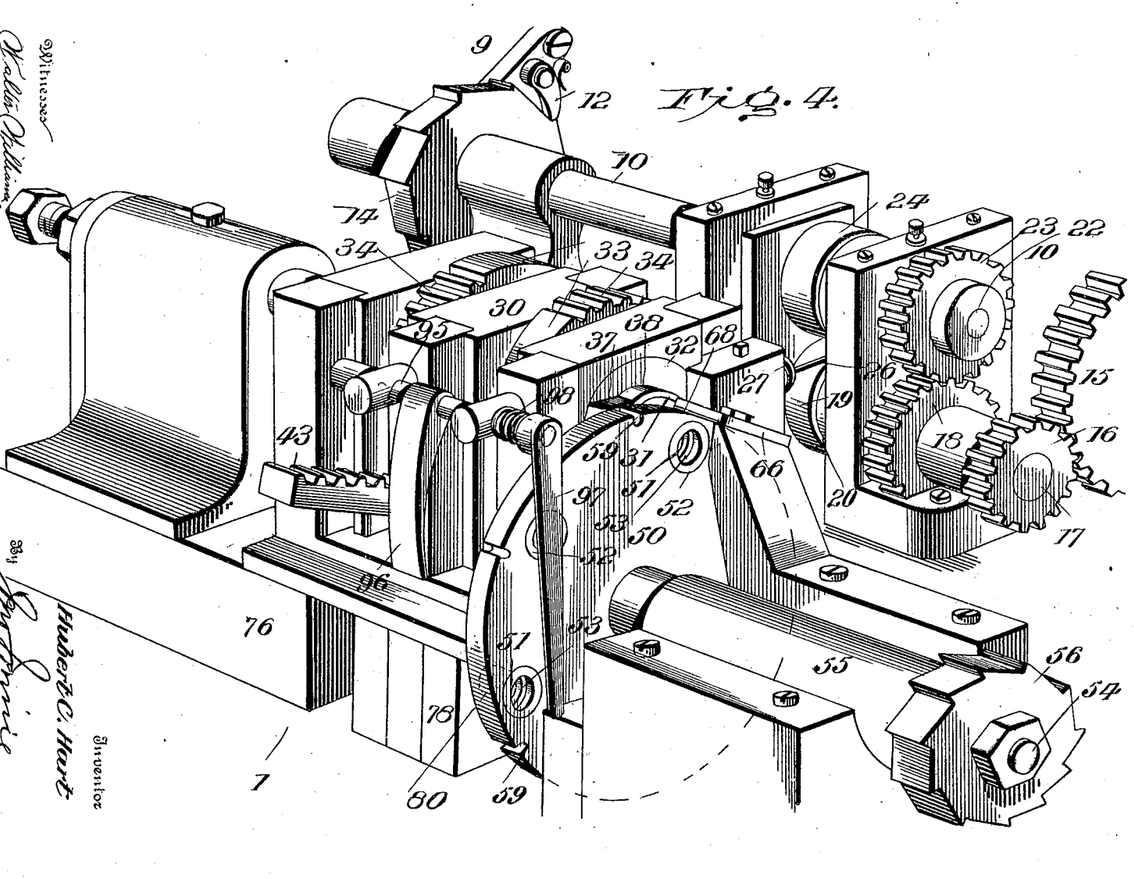
Fig. 4 is a detail perspective view.
Figure 5:
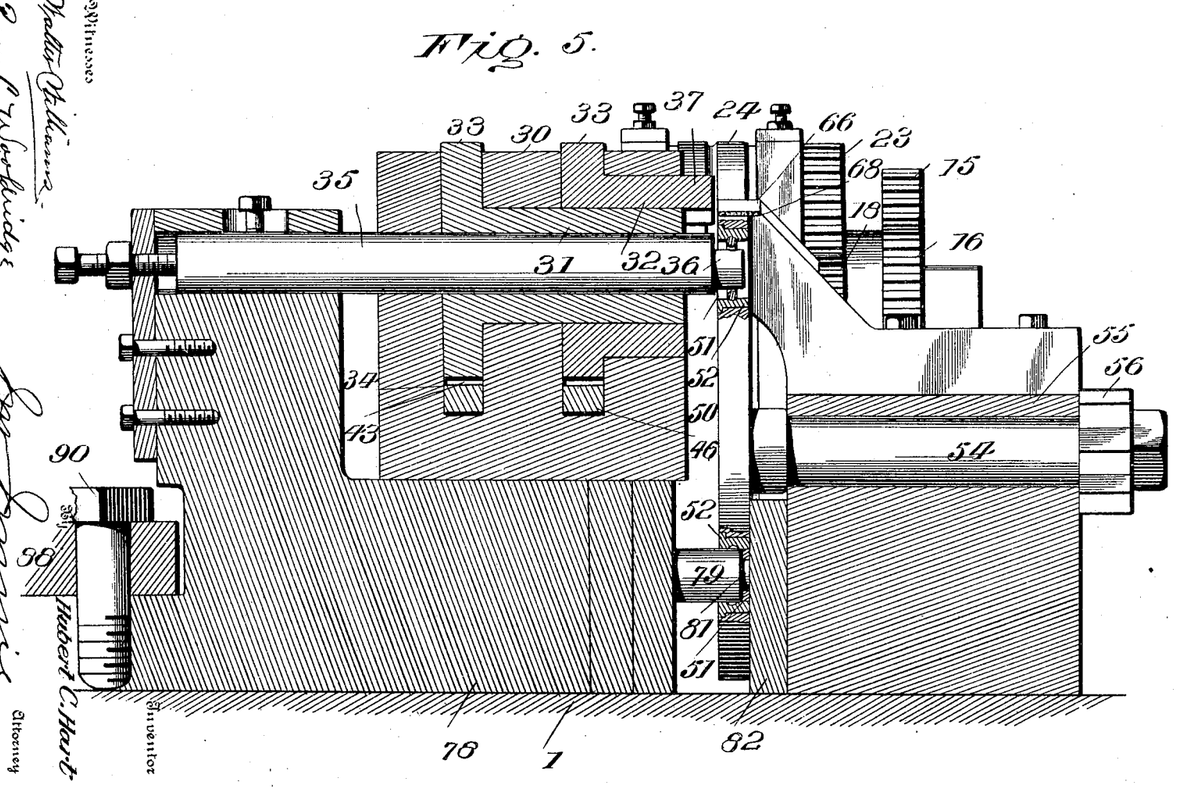
Fig. 5 is a transverse section on the line B B of Fig. 1.
Figures 6, 9:
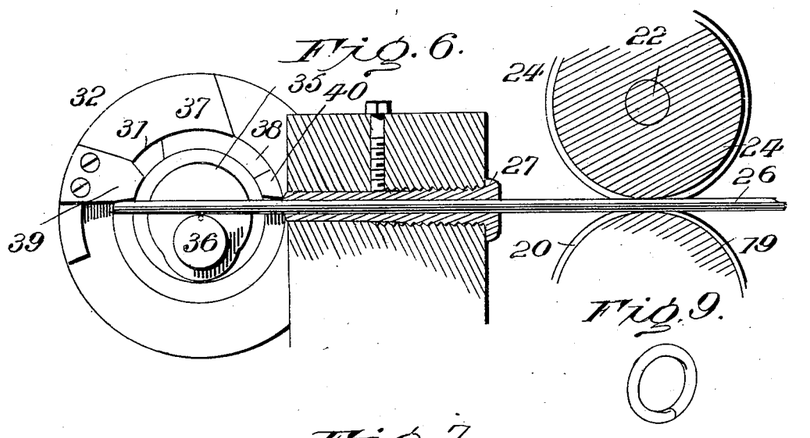
Fig. 6 is a diagrammatic view showing the wire fed to the formers in position to be made into a ring.
Fig. 9 is a detail perspective view of a ring.
Figures 7, 8, 10:
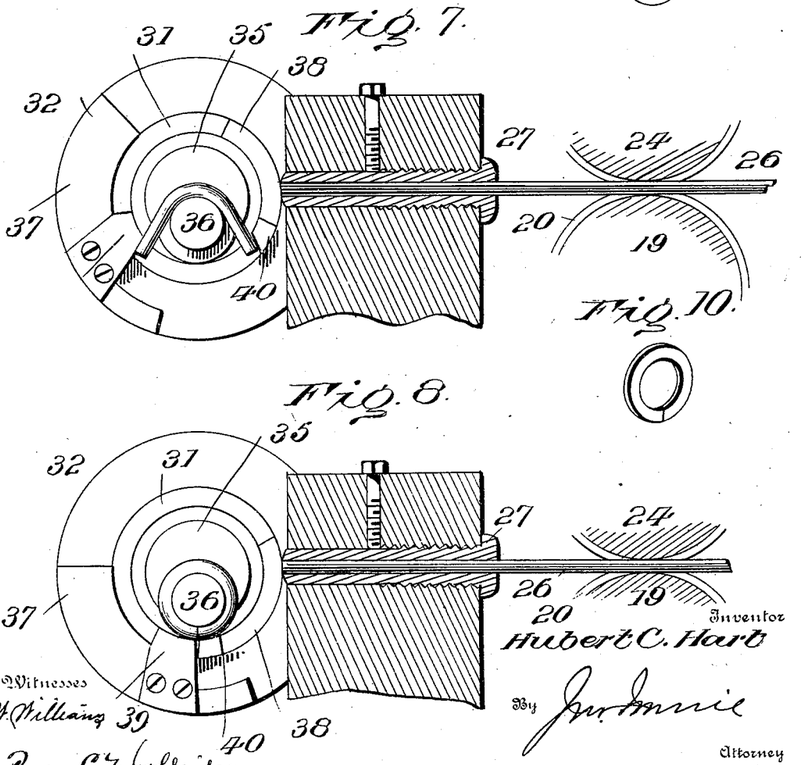
Fig. 7 is a similar view, the ring being partially completed.
Fig. 8 is a similar view showing the ring complete.
Fig. 10 is a detail perspective view of a completed washer.

*Means for cutting the wire into the desired lengths and then bending it into rings.*—A standard 30, secured to the bed 1, affords a bearing for the bending mechanism. This cutting and bending mechanism comprises two hubs 31 and 32, each having a flanged head 33, provided with peripheral teeth 34, and passing centrally through the inner hub 31 is a slidable rod 35, having formed on its outer end the mandrel 36, around which the ring is formed. The mandrel 36 is eccentrically situated with relation to its shaft 35 and the hubs 31 and 32, its lower face being spaced from the inner face of the overhanging portion 37 of the hub 32 equal to approximately the thickness of the wire the washer is to be made of. The hub 32 is of larger diameter than the hub 31, the former therefore having a bearing on the latter and each being revolved, or at least partially revolved, in opposite directions. Each hub has an extended overhanging portion 37 and 38, and on the opposite end of each of said extensions is a lug 39 and 40, the latter lugs forming the direct means for bending the wire. The lug 39 is made removable and adjustable, while the other, 40, is, in combination with the end of the guide 27, the cutter, which is clearly disclosed in Figs. 6, 7, and 8. On the shaft 4 are two cams 41 and 42, the one 41 operating a sliding lever 43, provided with teeth which engage the teeth on the periphery of the flange 33 of the hub 31, and the cam 42 engages a sliding lever 46, provided with teeth 47, engaging the teeth on the periphery of the flange of the hub 32. The grooves of the cams 41 and 42 are so located as to slide the levers 43 and 46 in opposite directions, thereby imparting a reverse revolving motion to the hubs 31 and 32. The wire having now been fed across the top of the mandrel 36, as shown in Fig. 6, the cams 41 and 42 immediately begin to slide the levers 43 and 46, and hence revolve the hubs 31 and 32, and the lugs 39 and 40 engage the ends of the wire, cutting it into the desired length and at the same time bending it to conform to the shape of the mandrel, or, in other words, form a ring. In this connection attention is directed to the relative location of the mandrel and hubs, as hereinbefore mentioned. Such relationship permits the full leverage of the lugs on the wire to be obtained, and at the proper time the arc of the circle gradually becomes such that the wire leaves the flat faces of the lugs and the two meeting ends thereof are crowded into the space formed between the bottom of the mandrel and the inner portion of the lugs, which also holds and prevents the ring from springing out of position. It must be remembered at this time that there will be a certain amount of resiliency in the metal, which would cause the ring to be dislocated from its mandrel were it not held in position. It is for this purpose also that the parts are eccentrically arranged.

*Carrier.*—The carrier consists of a disk 50, having a series of openings or ring-receptacles 51, said openings being provided with some suitable bushings 52, each bushing having a slight groove 53 to receive the ring as it is delivered from the mandrel. The disk is fixed to a shaft 54, mounted in bearings 55, secured to the bed 1, and on the outer end of the shaft 54 is a ratchet-wheel 56. To insure the positive positioning of the disk and the respective perforations with relation to the mandrel, &c., notches 59 are arranged in the periphery of the disk, one for each perforation, and into these notches fit a lock-pin 60. Said pin 60 is suitably guided and is operated by a trip-lever 61, pivoted at 62 and having one end engaged by a cam 63 on the face of the cam 42. Hence at the proper time the lever is struck by its cam and the lock-pin is withdrawn from its notch, whereupon the the disk may be revolved, the pin being forced into the next successive notch after the cam 63 has passed the lever 61 by a spring 65, and to prevent the disk being partially revolved by carelessness or by momentum I provide a friction-brake 66, which bears directly on the periphery of the disk, and is provided with a suitable wearing material 68, such as leather, wood, or the like. A cam 70 is mounted on the shaft 4 and operates a cam-lever 71, the end of which forms a pawl 72, which engages the ratchet 56 on the end of the shaft 54, imparting a step-by-step motion to the disk.

*Means for operating the mandrel, the anvil, and the ejector.*—Sliding in ways 76 under the standard 30 is a sliding block 78, to which is adjustably attached the rod 35, carrying the mandrel, and a die 79, and an injector-plunger 80, each disposed opposite respective perforations in the disk. The die 79 is reduced at its outer end, as at 81, and coacts with a stationary anvil 82, fixed in proper position to act in perfect unison with the die. A cam 85 on the shaft 4 operates a lever 86, provided with a link 87, which connects with a pair of toggle-levers 88, one being pivoted to the bed 1 at 89 and the other being pivotally connected to the sliding block 78 at 90. As the cam forces the lever 86 forward the toggle-levers are spread out, forcing the sliding block 78 in toward the disk 50, which movement delivers a ring to one of the openings 51, the anvil compresses the preceding ring in its respective opening 51, and the plunger ejects a complete washer from still a third opening.

Experience has demonstrated the necessity of providing a seperate mechanism to prevent the completed washer from sticking to the end of the plunger or the disk, and I have therefore devised the following device to absolutely remove it therefrom: A short shaft 95 is mounted in bearings fixed to the standards 30, and two arms 96 and 97 depend from said shaft, one of which, 97, plays against the front face of the disk 50, and when the washer is pushed out by the plunger this lever comes forward and removes it therefrom. The other arm 96 is positioned in the path of one of the slidable cam-levers 46, and as said lever moves forward it strikes the arm and imparts movement to its complementary arm 97 and removes the washer. A spring 98 returns the arms to their normal position after the withdrawal of the lever 46.

The operation of the machine is substantially as follows: The wire is fed to the feed-rollers 19 24 from a reel or other source. (Not shown.) The clutch 6 is operated, and the drive-shaft 4 receives its motion from the power-pulley 5, which, as previously stated, imparts movement to the various mechanisms. Cam 7 is so timed as to operate the gearing 15 17 and its coöperating members. Consequently the rollers 19 and 24 are revolved sufficiently to feed the wire of such length as will equal the diameter of the contemplated washer when it is formed, whereupon this mechanism ceases its operation, the spring 28 resetting the pawl 12 for the next movement of the cam 7. Immediately the wire is positioned over the mandrel the cams 41 and 42 impart motion to their respective levers, which places into operation the two oppositely-revolving formers, one of which cuts the wire and simultaneously bends the cut-off section of the wire into a ring, it being borne in mind that when the ring is completed it is positively held to the mandrel by the formers, and its natural tendency is to spring therefrom. The ring formed, cam 85 is so timed that it forces the toggles 88, and hence the slide 78, which carries the mandrel, the die, and the ejector, delivering the ring to one of the openings in the revolving carrier. The diameter of the openings in the carrier being equal to the diameter of the ring, and as the formers are practically against the one wall of the carrier it follows the ring must be pushed into its respective opening and upon reaching the groove 53 it springs therein by its own resiliency. The cam 85 now withdraws the toggle action and the slide 78 and its coacting parts assume their normal position, whereupon the cam 63 strikes the lever 61 and the lock 60 is withdrawn, at which time the cam 70 forces the lever 71 forward, revolving the carrier-disk, so as to present the opening containing the ring opposite the die 81. When this point is reached, the cam 63 releases its lever 61 and the lock 60, which again positively fastens the carrier in position, and the same operation of the various cams and levers is repeated; but this repetition accomplishes a three-fold result—i. e., makes and delivers a ring to its respective opening, compresses the ring first made into a flat washer, and upon the completion of the third ring the first one made is ejected, the cam 42 being so timed as to operate the lever 46 and oscillate the lever 97. The body of the die 81 being equal in diameter to the compressed ring and the opening in which it passes and the end of the die being of the same diameter as the inner diameter of the ring, it is obvious when the die is operated against the anvil the diameter of the flattened ring is not increased. In other words, its radius cannot become larger when pressure is applied, for the reason that the metal is confined. While the radius is maintained, the space between the flanged end of the die and the anvil is of smaller area than the diameter of the wire from which the ring is made. Hence when pressure is applied the volume of metal forming the ring is decreased and its density is considerably increased. The metal being confined radially and the space between the die and anvil being of less area than the volume of metal in the ring, it follows that a flat split-ring washer is produced having a uniform thickness and density.

Heretofore washers have been stamped from sheet metal, and to obtain a pound of washers it was necessary to use between three and three and one-half pounds of stock, necessitating a total loss in what is termed "scraps." It is therefore the purpose of this invention to avoid this unnecessary waste and produce for a pound of metal approximately a pound of washers.

I am aware it is old to make various articles from metal which has first been heated and then pressed while hot into predetermined shapes; but I am not aware of it being old to provide a mechanism for first bending wire or the like material while cold and in this state compress it into flat washers. In practice the wire is taken from the stock and fed to the machine, dispensing with what is well known in the art of metal-bending—i. e., heating the metal before working it.

The mechanism employed is extremely simple and durable in character and the various operations of the respective movements are automatic throughout.

Having thus described my invention, what I claim is—

1. A machine of the class described, comprising means for bending a single split ring from cold metal, a movable carrier, means for moving the carrier, means for delivering said split ring to said carrier, and means impinging two opposite sides of said ring while the latter is in the carrier, thereby forming a flat split washer.

2. A machine of the class described, comprising means for bending a single split ring from cold metal, a revolving carrier, means for revolving the carrier, means for delivering said split ring to said carrier and means impinging two opposite sides of said ring while the latter is in the carrier, thereby forming a flat split washer.

3. A machine of the class described comprising means for bending a single split ring from cold metal, a carrier having ring-receptacles, means for moving said carrier step by step, means for delivering said split ring to a receptacle of said carrier and means for compressing a ring at each step of the carrier, to form a split-ring washer.

4. A machine of the class described, comprising means for forming a single split ring, a revolving carrier having ring-receptacles, means for revolving said carrier step by step, means for delivering a split ring to a receptacle of the carrier at the completion of each step of the same, and means working simultaneously with the ring-delivering means for compressing a previously-made ring carried by the carrier into a flat split washer.

5. A machine of the class described, comprising means for forming a single split ring, a revolving carrier having a series of ring-receptacles, means operating said carrier step by step, means working parallel with the axis of the carrier for delivering an individual ring to the carrier at each step, and means impinging two opposite sides of a ring to compress the latter into a flat split washer.

6. A machine of the class described, comprising a mandrel, means for feeding wire to said mandrel, two oppositely-revolving formers for winding the wire around said mandrel to form a complete ring, means impinging two opposite sides of said ring to compress the latter into a split washer, and means equal in diameter to the ring for maintaining said diameter while being compressed.

7. A machine of the class described, comprising means for feeding metal to be bent into a ring, an eccentrically-arranged mandrel, two oppositely-revolving formers for winding the metal around said mandrel, and means for compressing the ring into a washer.

8. A machine of the class described, comprising a mandrel, means for feeding metal to said mandrel, two oppositely-revolving formers for winding the metal around said mandrel to form separate split rings, a carrier, means for moving said carrier step by step, means for delivering a split ring from the mandrel to the carrier, and means for compressing said ring into a flat washer.

9. A machine of the class described comprising a mandrel, means for feeding metal to said mandrel, two formers, one of which works within the other, each revolving in opposite directions and eccentrically to said mandrel, to form separate split rings, a movable carrier, means for delivering the ring on the mandrel to the carrier, means for revolving the carrier step by step, and a die and anvil for compressing the ring into a washer, while it is held by the carrier.

10. A machine of the class described, comprising a mandrel, means for feeding cold metal to said mandrel, means for bending the cold metal into a separate split ring around said mandrel, a movable carrier provided with ring-receptacles, a movable die, an anvil in alinement with said die, an ejector, and means for simultaneously delivering a ring to one of the receptacles of the carrier from the mandrel, forcing the die against the anvil to compress said ring into a washer and ejecting from a receptacle a previously-made washer.

11. A machine of the class described comprising a mandrel, two formers revolving in opposite directions around said mandrel to bend the metal into rings, each of said formers having a series of teeth, racks engaging said teeth, a power-shaft, means on said shaft for communicating a reverse movement to said racks, and means for compressing the metal into a washer.

12. A machine of the class described, comprising means for making a separate split ring, a carrier mounted on a shaft, means for revolving said shaft step by step, a series of receptacles, being formed in the carrier, means for delivering a split ring to one of the receptacles, a die and anvil in line with each other and on opposite sides of the carrier, an ejector, and means for positively stopping the revolving carrier to present a ring-receptacle respectively in the path of the mandrel, the die and anvil and the ejector.

13. A machine of the class described comprising a mandrel, means for feeding metal to said mandrel, two oppositely-revolving formers to make rings, means for imparting motion to said formers, a carrier having ring-receptacles, means for delivering a ring to the receptacles in said carrier, means for compressing the ring into a washer, an ejector, and means for positively removing the completed washer from the carrier and the ejector.

14. A machine of the class described, comprising a mandrel, means for feeding metal to said mandrel, two oppositely-revolving formers to make rings, means for imparting motion to said formers, a carrier having ring-receptacles, means for delivering a ring to the receptacles in the carrier, means for compressing the ring into a washer, an ejector, a lever adapted to oscillate on the face of the carrier to positively remove the completed washer therefrom and the ejector, and means for oscillating said lever across the receptacle just as the ejector ejects the washer.

15. A machine of the class described, comprising a mandrel, means for feeding wire step by step to said mandrel, a stationary shear, and two oppositely-revolving formers engaging said wire on the mandrel, one of said formers being a shear which coacts with the stationary shear to cut the wire in sections, all for the purpose of cutting wire into the desired length and forming it into a ring.

16. A machine for the purpose specified, comprising a mandrel, means for feeding cold wire step by step to said mandrel, means for simultaneously cutting and bending the wire while it is cold into a separate split ring of a diameter approximately equal to the predetermined washer, means for compressing said ring into a flat split-ring washer, and means for preserving the diameter of the split ring after said ring is formed into a washer.

17. A machine for the purpose specified, comprising means for feeding wire step by step to a mandrel, two oppositely-revolving members which simultaneously cut, and bend the wire into separate split rings, and means for compressing said ring into a flat split-ring washer.

18. A machine of the class described, comprising means for making an individual split ring, a revolving carrier, means for revolving said carrier periodically, a friction-brake to act on said carrier, a series of openings or ring-receptacles being formed in the carrier which are equal in diameter to a split ring, means for delivering a ring to said receptacle, means being provided in each receptacle for holding the ring in position therein, and means for compressing said ring into a flat split-ring washer.

19. A machine of the class described, comprising means for bending wire into split rings, a movable carrier having a series of openings or receptacles, of the shape and size of the ring made, each receptacle being provided with a groove to form a seat or means for holding the ring in position, means for delivering said ring to said seat, and means for compressing the same into a flat split-ring washer.

20. In a machine of the class described, means for forming a separate ring, a carrier having a series of openings, means for delivering a ring to one of said openings, means in each opening for holding a ring, a movable die, an anvil, means for revolving the carrier to present a ring in alinement with the die and anvil, means for forcing in said die toward the anvil to compress the ring into a flat split-ring washer, and simultaneously therewith deliver a second sing to a second opening in the carrier.

21. A machine of the class described, comprising a mandrel, and two members working eccentrically to said mandrel, for forming a ring and positively holding said ring to said mandrel, and means for compressing said ring into a washer.

In testimony whereof I have hereunto set my hand in the presence of two subscribing witnesses.

HUBERT CHAUNCEY HART.

Witnesses:
ALBERT C. SAVAGE,
DONIZA MATTHEWS.